United States Patent
Potapenko et al.

(10) Patent No.: US 10,851,283 B2
(45) Date of Patent: Dec. 1, 2020

(54) METHODS OF ZONAL ISOLATION AND TREATMENT DIVERSION WITH SHAPED PARTICLES

(71) Applicant: SCHLUMBERGER TECHNOLOGY CORPORATION, Sugar Land, TX (US)

(72) Inventors: Dmitriy Ivanovich Potapenko, Sugar Land, TX (US); Alexey Alexandrovich Sova, Novosibirsk (RU); Dmitry Sergeyevich Solnyshkin, Novosibirsk (RU); Maxim Grigorievich Ivanov, Novosibirsk (RU); Olga Petrovna Alekseenko, Novosibirsk (RU); Marina Nikolaevna Bulova, Moscow (RU); Bruno Lecerf, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/517,019

(22) PCT Filed: Oct. 6, 2014

(86) PCT No.: PCT/RU2014/000744
§ 371 (c)(1),
(2) Date: Apr. 5, 2017

(87) PCT Pub. No.: WO2016/056934
PCT Pub. Date: Apr. 14, 2016

(65) Prior Publication Data
US 2017/0253788 A1   Sep. 7, 2017

(51) Int. Cl.
*E21B 33/13*     (2006.01)
*C09K 8/516*    (2006.01)
(Continued)

(52) U.S. Cl.
CPC .............. *C09K 8/516* (2013.01); *C09K 8/02* (2013.01); *C09K 8/03* (2013.01); *C09K 8/62* (2013.01);
(Continued)

(58) Field of Classification Search
None
See application file for complete search history.

(56) References Cited

U.S. PATENT DOCUMENTS 2,754,910 A *  7/1956  Derrick .................... C09K 8/60
                                                                  137/512
3,376,934 A    4/1968  Wilman et al.
(Continued)

FOREIGN PATENT DOCUMENTS

WO    2008068645 A1    6/2008

OTHER PUBLICATIONS

Shahinpoor, M. Statistical mechanical considerations on the random packing of granular materials. Powder Technology. 1980, vol. 25, pp. 763-176.
(Continued)

*Primary Examiner* — Andrew Sue-Ako
(74) *Attorney, Agent, or Firm* — Rodney Warfford

(57) ABSTRACT

Methods of treating a subterranean formation are disclosed that include introducing a treatment fluid including shaped particle and/or shaped uniform particles into a subterranean formation via a wellbore, and creating a plug including the shaped particle and/or shaped uniform particles of the treatment fluid.

9 Claims, 6 Drawing Sheets

(51) Int. Cl.
  *E21B 43/267* (2006.01)
  *C09K 8/02* (2006.01)
  *C09K 8/03* (2006.01)
  *C09K 8/62* (2006.01)
  *C09K 8/72* (2006.01)

(52) U.S. Cl.
  CPC ............... *C09K 8/72* (2013.01); *E21B 33/13* (2013.01); *E21B 43/267* (2013.01); *C09K 2208/08* (2013.01); *C09K 2208/10* (2013.01)

(56) References Cited

U.S. PATENT DOCUMENTS

| | | | |
|---|---|---|---|
| 3,437,147 | A | 4/1969 | Davies |
| 4,102,401 | A | 7/1978 | Erbstoesser |
| 4,848,467 | A | 7/1989 | Cantu et al. |
| 4,957,165 | A | 9/1990 | Cantu et al. |
| 4,986,355 | A | 1/1991 | Casad et al. |
| 5,253,709 | A | 10/1993 | Kendrick et al. |
| 5,485,882 | A | 1/1996 | Bailey et al. |
| 7,036,587 | B2 | 5/2006 | Munoz, Jr. et al. |
| 7,267,170 | B2 | 9/2007 | Mang et al. |
| 7,334,635 | B2 | 2/2008 | Nguyen |
| 7,380,600 | B2 | 6/2008 | Willberg et al. |
| 7,506,689 | B2 | 3/2009 | Surjaatmadja et al. |
| 7,565,929 | B2 | 7/2009 | Bustos et al. |
| 8,734,830 | B2 | 5/2014 | Hwang et al. |
| 8,744,329 | B2 | 6/2014 | Yamada |
| 8,991,494 | B2 | 3/2015 | Willberg et al. |
| 2006/0113077 | A1 | 6/2006 | Willberg et al. |
| 2006/0175059 | A1 | 8/2006 | Sinclair et al. |
| 2006/0185848 | A1 | 8/2006 | Surjaatmadja et al. |
| 2007/0131424 | A1* | 6/2007 | Fripp ............... C09K 8/80 166/280.2 |
| 2007/0187099 | A1* | 8/2007 | Wang ............... C09K 8/516 166/295 |
| 2008/0093073 | A1 | 4/2008 | Bustos et al. |
| 2009/0029878 | A1* | 1/2009 | Bicerano ............ C09K 8/035 507/107 |
| 2009/0044945 | A1 | 2/2009 | Willberg et al. |
| 2009/0101334 | A1 | 4/2009 | Baser et al. |
| 2009/0188718 | A1* | 7/2009 | Kaageson-Loe ...... E21B 21/003 175/40 |
| 2010/0212906 | A1 | 8/2010 | Fulton et al. |
| 2010/0267591 | A1 | 10/2010 | Todd et al. |
| 2011/0226479 | A1* | 9/2011 | Tippel ............... E21B 33/138 166/305.1 |
| 2011/0307105 | A1* | 12/2011 | Commoner ......... E21B 43/0122 700/282 |
| 2012/0067581 | A1* | 3/2012 | Auzerais ............ C04B 40/0633 166/308.1 |
| 2012/0125618 | A1 | 5/2012 | Willberg et al. |
| 2012/0181034 | A1 | 7/2012 | Bour et al. |
| 2012/0192640 | A1* | 8/2012 | Minh ............... E21B 7/06 73/152.16 |
| 2013/0292117 | A1* | 11/2013 | Robisson ............ E21B 43/08 166/278 |
| 2014/0231086 | A1* | 8/2014 | Jamison ............ E21B 21/003 166/292 |

OTHER PUBLICATIONS

Sherwood, J.D. Packing of spheroids in three-dimensional space by random sequential addition. J. Phys. A: Math. Gen. 1997, vol. 30, L839-L843.

Sahu, K.K., Ishihara, K.N. Modeling local voids using an irregular polyhedron based on natural neighbourhood and application to characterize near-dense random packing (DRP). Philosophical Magazine. 2006, vol. 86, pp. 5909-5926.

Torquato, S., Jiao, Y. Dense packing of the Platonic and Archimedean solids. Nature. 2009, vol. 460, pp. 876-880.

Harrison, "Diverting Agents—History and Applications", Journal of Petroleum Technology, 1972, pp. 593-598.

Glasbergen et al., "Design and field testing of a truly novel diverting agent", SPE 102606, 2006, 20 pages.

Potapenko et al., "Barnett shale refracture stimulations using a novel diversion technique", SPE 119636, 2009, 11 pages.

Hill et al., "Laboratory and theoretical modeling of diverting agent behavior", Journal of Petroleum Technology, Jul. 1984, pp. 1157-1163.

Doerler et al., "Diverting agents: laboratory study and modeling of resultant zone injectivities", 1987, SPE 16250, pp. 45-56.

Nitters et al., "Granular diverting agents selection, design and performance", 1989, SPE 18884, pp. 531-538.

Strassner et al., "Laboratoory/field study of oil-soluble resin-diverting agents in Prudhoe Bay, Alaska, Acidizing Operations", 1990, SPE 20622, pp. 77-86.

Torquato et al., "Dense packing of polyhedra: Platonic and Archemedian solids", Physical Review E., 2009, vol. 80, pp. 041104-1 to 041104-21.

Jia et al., "Validation of a digital packing algorithm in predicting powder packing densities" Powder Technology, Nov. 2007, vol. 174, pp. 10-13.

Stafford et al., "Using level sets for creating virtual random packs of non-spherical convex shapes", Journal of Computational Physics, 2010, vol. 229, pp. 3295-3315.

Jaoshvili et al., "Experiments on the random packing of tetrahedral dice", Physical Review Letters, 2010, vol. 104, pp. 185501-1 to 185501-4.

Johnson Jr. et al., "Large-Volume, High-Rate Stimulation Treatments in Horizontal Wells in the Niobara Formation, Silo Field, Laramie Country, Wyoming", 1993, SPE-25926, 14 pages.

Bell et al., "Effective diverting on horizontal wells in the Austin Chalk", 1993, SPE 26582 14 pages.

Gallus et al., "Fluid diversion to improve well stimulation", 1972, SPE 3811, 16 pages.

Smith et al., "New diverting techniques for acidizing and fracturing", 1969, SPE 2751, 8 pages.

Gallus et al., "Deformable diverting agent for improved well stimulation" Journal of Petroleum Technology. Apr. 1969, SPE 2161, pp. 497-504.

Office Action issued in Russian Patent Appl. No. 2017115473/03(026867) dated Apr. 4, 2018; 13 pages (with English translation).

Kaiumov et al., "Fracture with channels inside the crack and cylindrical proppant", Oil and Gas Journal Russia, Jun./Jul. 2014, p. 46-51.

\* cited by examiner

METHODS OF ZONAL ISOLATION AND TREATMENT DIVERSION WITH SHAPED PARTICLES

BACKGROUND

Hydrocarbons (oil, condensate, and gas) may be produced from wells that are drilled into formations containing them. For a variety of reasons, such as low permeability of the reservoirs or damage to the formation caused by drilling and completion of the well, the flow of hydrocarbons into the well may be undesirably low. In this case, the well is "stimulated," for example, using hydraulic fracturing, chemical (such as an acid) stimulation, or a combination of the two (often referred to as acid fracturing or fracture acidizing).

In hydraulic and acid fracturing, a first, viscous fluid called a pad may be injected into the formation to initiate and propagate the fracture. This may be followed by a second fluid that contains a proppant to keep the fracture open after the pumping pressure is released. Granular proppant materials may include, for example, sand, ceramic beads, or other materials. In "acid" fracturing, the second fluid may contain an acid or other chemical, such as a chelating agent, that can assist in dissolving and/or dissolve part of the rock, causing irregular etching of the fracture face and removal of some of the mineral matter, which results in the fracture not completely closing when the pumping is stopped. Occasionally, hydraulic fracturing may be done without a highly viscosified fluid (such as water) to minimize the damage caused by polymers or the cost of other viscosifiers.

Hydraulic and acid fracturing of horizontal wells (or multi-layered formations) may include diverting techniques in order to enable fracturing redirection between different zones. These diverting methods may include, for example, using mechanical isolation devices, such as packers and wellbore plugs, setting bridge plugs, pumping ball sealers, pumping slurred benzoic acid flakes and removable/degradable particulates. In addition, other treatment operations may use diverting techniques.

Treatment diversion with particulates may be based on bridging of particles of the diverting material behind casing and forming a plug by accumulating the rest of the particles at the formed bridge. Some concerns related to treatment diversion with particulate materials include reducing bridging ability of diverting slurry during pumping because of dilution with wellbore fluid (interface mixing), large amount of diverting materials used, and stability of some diverting agents during pumping and during subsequent treatment stage.

During the drilling of a wellbore, various fluids may be used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Lost circulation is a recurring drilling problem, characterized by loss of drilling mud into downhole formations, which can occur naturally in formations that are fractured, highly permeable, porous, or cavernous. Such formations may include, for example, shale, sands, gravel, shell beds, reef deposits, limestone, dolomite, or chalk. Other problems encountered while drilling and producing oil and gas include stuck pipe, hole collapse, loss of well control, and loss of or decreased production.

Lost circulation is frequently controlled by including an additive or diverting agent in fluids injected into wellbores. Traditional additives or diverting agents may be less effective when the agents separate during pumping by, for example, weight, size, and/or density, such that the permeability of the formed plug is different from that expected. Particles for zonal isolation and treatment diversion that reduce the risk of particle separation during pumping and result in forming plugs of predictable permeability downhole are desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, the present disclosure pertains to methods for treating a subterranean formation including introducing a treatment fluid into a subterranean formation, the treatment fluid including a plurality of first particles, where each particle of the plurality of first particles has a first three-dimensional shape, and the dimensions of the first three-dimensional shape of each particle of the plurality of first particles are substantially uniform; and forming a plug comprising at least a portion of the plurality of first particles in the subterranean formation, where the first three-dimensional shape is a member selected from the group consisting of a cylinder, a spherocylinder, and a polyhedral shape.

In some embodiments, the present disclosure aims at methods for treating a subterranean formation including manufacturing a plurality of first particles at the well site via an apparatus for a building a three dimensional object, the apparatus including a storage chamber for storing build material, and a metering system to regulate the quantity of build material delivered from the storage chamber to an operating position; introducing a treatment fluid into a subterranean formation, the treatment fluid including a plurality of first particles, where each particle of the plurality of first particles has a first three-dimensional shape, and the dimensions of the first three-dimensional shape of each particle of the plurality of first particles are substantially uniform; and forming a plug comprising at least a portion of the plurality of first particles in the subterranean formation, where the first three-dimensional shape is a member selected from the group consisting of a cylinder, a spherocylinder, and a polyhedral shape.

BRIEF DESCRIPTION OF THE DRAWINGS

The manner in which the objectives of the present disclosure and other desirable characteristics may be obtained is explained in the following description and attached drawings in which.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

Figure 1:
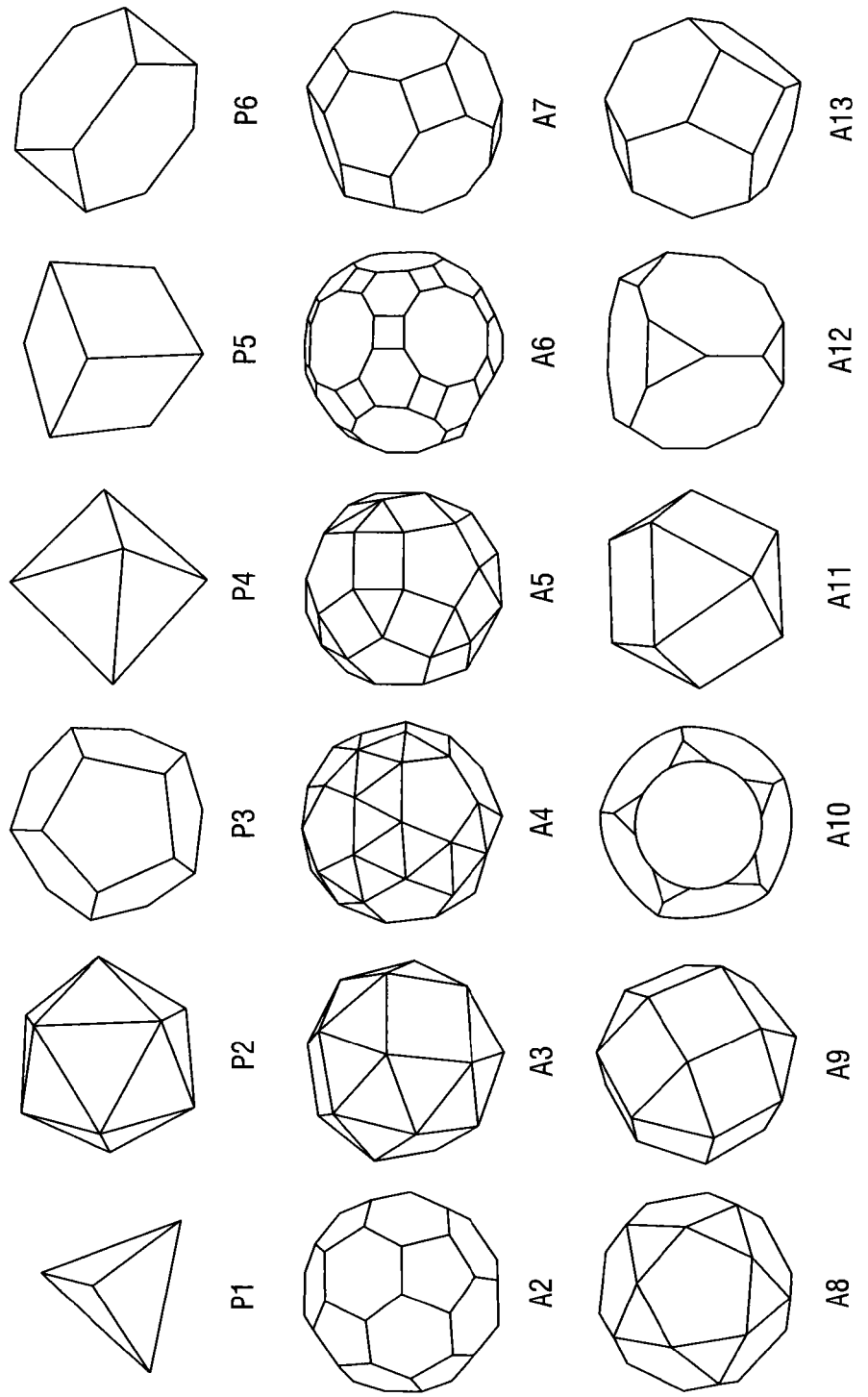
FIG. 1 is an illustration of five Platonic (tetrahedron (P1), icosahedron (P2), dodecahedron (P3), octahedron (P4) and cube (P5)) and fifteen Archimedean (the truncated tetrahedron (A1), truncated icosahedron (A2), snub cube (A3), snub dodecahedron (A4), rhombicosidodecahedron (A5), truncated icosidodecahedron (A6), truncated cuboctahedron (A7), icosidodecahedron (A8), rhombicuboctahedron (A9), truncated dodecahedron (A10), cuboctahedron (A11), truncated cube (A12), and truncated octahedron (A13)) solids; the cube (P5) and truncated octahedron (A13) are Platonic and Archimedean solids.
Figure 2A:
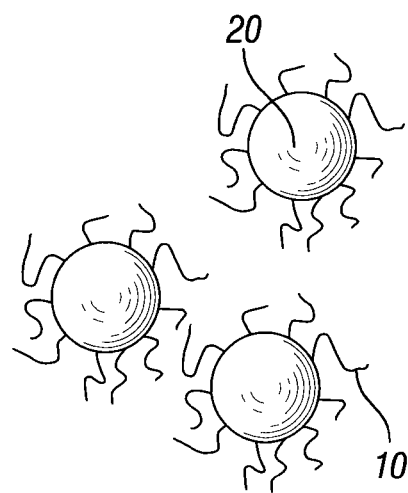
FIG. 2 is an illustration of shaped particles having shapes that enable low plug permeability.
Figure 2B:
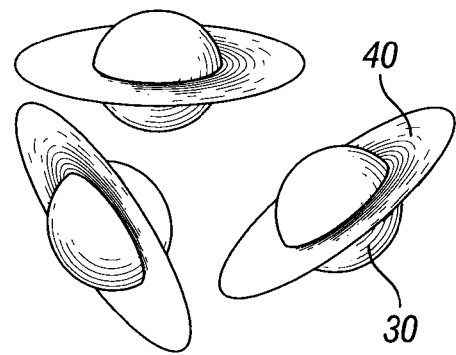

The present disclosure relates to methods of treating a subterranean formation, such as for diversion or for temporally zonal isolation. The methods of the present disclosure may comprise introducing a treatment fluid including a composition comprising shaped particles. Such shaped particles may be in the form of, for example, particles of a three-dimensional shape selected from a cylinder, a spherocylinder, and/or a polyhedral shape (such as, for example, a Platonic solid or an Archimedean solid (as depicted in FIG. 1)). Further suitable shaped particles may include particles having a rigid core and components fixed or attached to the rigid core, such as fixed or attached materials in the form of one or more fibers, films or flakes (examples of such particles may include hairy particles, as depicted in FIG. 2A, and particles comprising a rigid core (such as in the form of a sphere) with one or more films and/or flakes attached thereto, as depicted in FIG. 2B). In embodiments, the collection of particles may serve to reduce permeability of packs comprising such particles.

In some embodiments, the shaped particles and/or shaped uniform particles are not in the shape of a sphere (that is, not in the shape of a round geometrical and circular object in three-dimensional space that resembles the shape of a completely round ball), but instead are a shape selected from, for example, a particle of a three-dimensional shape selected from a cylinder, a spherocylinder, and/or a polyhedral shape (such as, for example, a Platonic solid or an Archimedean solid). In some embodiments, the shaped uniform particles may comprise one or more flat faces (that is, a flat portion or plane on the surface of the particle). The one or more flat faces of the shaped uniform particles used in the methods of the present disclosure may be flat congruent faces that are in the form of a regular polygon. For example, the shaped uniform particles comprising one or more flat faces (or flat congruent faces) may be a Platonic solid. Such Platonic solids may be a regular, convex polyhedron with flat congruent faces (such as 4, 6, 8 12, or 20 flat congruent faces) of regular polygons, where the flat congruent faces meet at each vertex of the respective Platonic solid (in such embodiments, the flat congruent faces of the shaped uniform particle may account for 100% of the surface area of the shaped uniform particle).

In embodiments where the shaped particles and/or shaped uniform particles comprise one or more flat faces, the one or more flat faces may account for at least about 10% of the surface area of the shaped uniform particle, or at least about 20% of the surface area of the shaped uniform particle, such as from about 25% to about 99.9% of the surface area of the shaped uniform particle, or about 40% to about 99% of the surface area of the shaped uniform particle, or about 75% to about 95% of the surface area of the shaped uniform particle.

Figure 3:
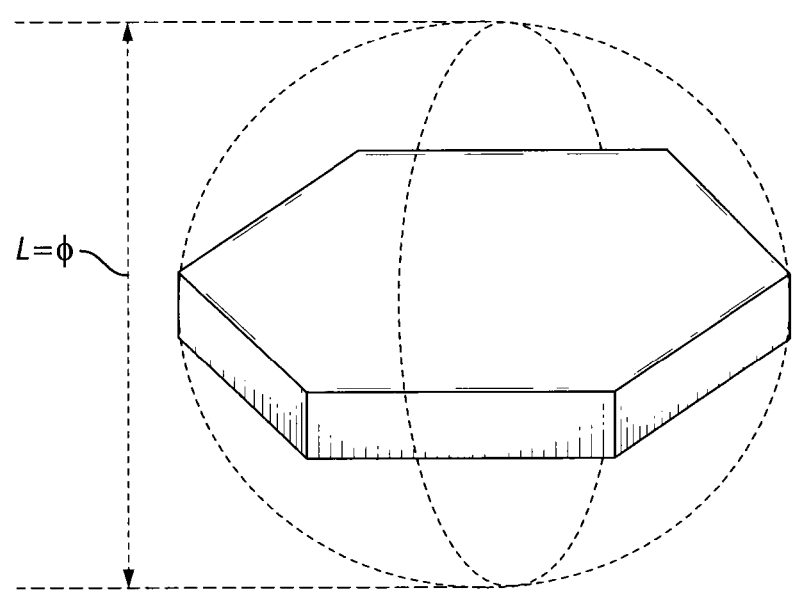
FIG. 3 is an illustration of the definition of particle size.

The shaped particles and/or shaped uniform particles, such as shaped uniform particles comprising one or more flat faces and/or one or more congruent faces (which optionally may be flat), may have any desired particle size and/or shape, and may be manufactured either offsite or at the location of the well site. The terms "size" and "particle size" as used in the present disclosure (when referring to a shaped uniform particle) refer to the diameter of the smallest imaginary circumscribed sphere that includes the shaped particle or shaped uniform particle, as shown in FIG. 3 for a hypothetical individual shaped uniform particle having a number of flat faces, which is envisioned for a desired/ intended down hole operation.

In some embodiments, the treatment fluids used in the methods of the present disclosure may include a composition comprising a plurality of shaped particles where each particle of the plurality of shaped particles has a three-dimensional shape (that is a substantially identical shape or congruent shape), the specific three-dimensional shape (or simply "shape", with these terms being used interchangeably throughout the present disclosure) and dimensions of the specific shape having been selected for an intended down hole operation, such as for diversion or for temporally zonal isolation. Such particles possessing a substantially identical shape or congruent shape may be referred to as "shaped uniform particles". In some embodiments, the dimensions of the three-dimensional shape of each particle of the plurality of shaped particles are uniform in that a diameter of the smallest imaginary circumscribed sphere that includes each particle of the plurality of shaped particles varies by no more than ±50%, such as by no more than ±10%, or no more than ±5%, or no more than ±2%.

The term "shaped uniform particle" refers to an individual particle of a group of specifically designed particles where each particle in the group has a three-dimensional shape and size that is substantially identical to an individual shaped uniform particle (which may be a hypothetical model, hereinafter referred to as a "hypothetical individual shaped uniform particle") envisioned and designed for the intended down hole operation. Such a hypothetical individual shaped uniform particle may have a three-dimensional shape selected from, for example, a Platonic solid, an Archimedean solid, or a particle of a three-dimensional shape selected from a cylinder, a spherocylinder, and/or a polyhedral shape. Suitable Platonic shapes include, for example, tetrahedrons, cubes, octahedrons, icosahedrons or dodecahedrons. Suitable Archimedean shapes include, for example, truncated tetrahedron, truncated icosahedron, snub cube, snub dodecahedron, and truncated octahedron.

A shaped uniform particle is considered to be "substantially identical" to a hypothetical individual shaped uniform particle (or another individual shaped uniform particle) envisioned for the intended down hole operation when the shaped uniform particle has a size, which is defined as a diameter of the smallest imaginary circumscribed sphere that includes the shaped uniform particle, that varies by no more than ±50%, such as by no more than ±10%, or no more than ±5%, or no more than ±2%, relative to the diameter of a smallest imaginary circumscribed sphere that would include the hypothetical individual shaped uniform particle (or the other individual shaped uniform particle) envisioned for the intended down hole operation.

For example, in some embodiments, such as those in which the shaped uniform particle has a size that varies by no more than ±50%, the hypothetical individual shaped uniform particle envisioned for the intended down hole operation may be a Platonic solid, such as, for example, a tetrahedron, in which the diameter of the smallest imaginary circumscribed sphere that includes the selected hypothetical tetrahedron envisioned for the intended down hole operation is, for example, about 2.0 mm. In such embodiments, the shaped uniform particles of the present disclosure would include those particles having a tetrahedron shape (that is, a regular, convex polyhedron with four flat congruent faces, the flat congruent faces meeting at each vertex of the tetrahedron) that have a respective imaginary circumscribed sphere with a diameter of from about 1 mm to about 3 mm. In other words, the shaped uniform particles of the present disclosure would include particles having a tetrahedron shape small enough to fit within an imaginary circumscribed sphere having a diameter of about 3 mm (which is the upper-end size limit), but those particles having a tetrahedron shape that would fit within an imaginary circumscribed sphere having a diameter of about 1 mm (which is the lower-end size limit) would be excluded.

As used herein, the term "treatment fluid," refers to any pumpable and/or flowable fluid used in a subterranean operation in conjunction with a desired function and/or for a desired purpose. Such treatment fluids may be modified to contain a plurality of shaped particles, such as a plurality of shaped uniform particles (for example, a plurality of shaped uniform particles where each shaped uniform particle comprises at least one flat face and/or at least one congruent face). In some embodiments, the pumpable and/or flowable treatment fluid may have any suitable viscosity, such as a viscosity of from about 1 cP to about 10,000 cP (such as from about 10 cP to about 1000 cP, or from about 10 cP to about 100 cP) at the treating temperature, which may range from a surface temperature to a bottom-hole static (reservoir) temperature, such as from about 0° C. to about 150° C., or from about 10° C. to about 120° C., or from about 25° C. to about 100° C., and a shear rate (for the definition of shear rate reference is made to, for example, Introduction to Rheology, Barnes, H.; Hutton, J. F; Walters, K. Elsevier, 1989, the disclosure of which is herein incorporated by reference in its entirety) in a range of from about $1\ s^{-1}$ to about $1000\ s^{-1}$, such as a shear rate in a range of from about $100\ s^{-1}$ to about $1000\ s^{-1}$, or a shear rate in a range of from about $50\ s^{-1}$ to about $500\ s^{-1}$ as measured by common methods, such as those described in textbooks on rheology, including, for example, Rheology: Principles, Measurements and Applications, Macosko, C. W., VCH Publishers, Inc. 1994, the disclosure of which is herein incorporated by reference in its entirety.

The term "treatment," or "treating," does not imply any particular action by the fluid. For example, a treatment fluid placed or introduced into a subterranean formation subsequent to a leading-edge fluid may be a hydraulic fracturing fluid, an acidizing fluid (acid fracturing, acid diverting fluid), a stimulation fluid, a sand control fluid, a completion fluid, a wellbore consolidation fluid, a remediation treatment fluid, a cementing fluid, a driller fluid, a frac-packing fluid, or gravel packing fluid. In the methods of the present disclosure, any one of the above fluids may be modified to include a plurality of shaped particles and/or shaped uniform particles, such as a plurality of shaped uniform particles where each shaped uniform particle comprises one or more flat faces and/or one or more congruent faces. The treatment fluids comprising a plurality of shaped particles and/or shaped uniform particles, such as a plurality of shaped uniform particles where each shaped uniform particle comprises one or more flat faces and/or one or more congruent faces, may be used in full-scale operations, pills, slugs, or any combination thereof. As used herein, a "pill" or "slug" is a type of relatively small volume of specially prepared treatment fluid placed or circulated in the wellbore.

A "wellbore" may be any type of well, including, a producing well, a non-producing well, an injection well, a fluid disposal well, an experimental well, an exploratory deep well, and the like. Wellbores may be vertical, horizontal, deviated some angle between vertical and horizontal, and combinations thereof, for example a vertical well with a non-vertical component.

The term "field" includes land-based (surface and subsurface) and sub-seabed applications. The term "oilfield," as used herein, includes hydrocarbon oil and gas reservoirs, and formations or portions of formations where hydrocarbon oil and gas are expected but may additionally contain other materials such as water, brine, or some other composition.

As used herein, the term "treating temperature," refers to the temperature of the treatment fluid that is observed while the treatment fluid is performing its desired function and/or desired purpose, such as forming a plug or fracturing a subterranean formation.

The term "fracturing" refers to the process and methods of breaking down a geological formation and creating a fracture, such as the rock formation around a wellbore, by pumping a treatment fluid at very high pressures (pressure above the determined closure pressure of the formation), in order to increase production rates from or injection rates into a hydrocarbon reservoir. The fracturing methods of the present disclosure may include a composition containing a plurality of shaped particles and/or shaped uniform particles, such as a plurality of shaped uniform particles where each shaped uniform particle comprises one or more flat faces and/or one or more congruent faces, in one or more of the treatment fluids, but otherwise use conventional techniques known in the art.

The treatment fluids of the present disclosure (and porous packs comprising a plurality of shaped particles and/or shaped uniform particles, such as a plurality of shaped uniform particles where each shaped uniform particle comprises one or more flat faces and/or one or more congruent faces, generated during the methods of the present disclosure) may be introduced during methods that may be applied at any time in the life cycle of a reservoir, field or oilfield. For example, the methods and treatment fluids of the present disclosure may be employed in any desired downhole application (such as, for example, stimulation) at any time in the life cycle of a reservoir, field or oilfield.

In embodiments, the treatment fluids of the present disclosure, which comprise a plurality of shaped particles and/or shaped uniform particles, such as a plurality of shaped uniform particles where each shaped uniform particle comprises one or more flat faces and/or one or more congruent faces, may be formed at the surface of the wellbore, such as upon identifying the desired shape, size and/or amount of the shaped and/or shaped uniform particles to be placed or introduced into a wellbore. In some embodiments, the shaped particles and/or the shaped uniform particles themselves may be manufactured onsite (that is, at the location of the well site). In such embodiments, the shaped particles and/or shaped uniform particles may be manufactured at the well site by any desired manufacturing technique, such as additive manufacturing. An action or event occurring "at the location of the well site", "at the surface", "at the well site", or "onsite" refers, for example, to an action or event that happens above ground at or near the wellbore, that is, not at an underground location, such as within the wellbore or within the subterranean formation.

The term "additive manufacturing" refers, for example, to using 3D printers as production tools, such as at locations at or near the wells site, to manufacture the shaped particles and/or shaped uniform particles to be placed or introduced into a wellbore. Such shapes can be manufactured on site (or in some embodiments, manufacturing may occur in the wellbore) by additive manufacturing techniques and optimized for their desired downhole application (that is, shapes that are fit for their intended downhole purpose). Examples of shaped particles and/or shaped uniform particles that may be manufactured via additive manufacturing, which optionally may occur at the well site, include shapes optimized for proppant pack stabilization (for example, shaped particles and/or shaped uniform particles, such as in the form of proppants, with male/female features that lock to each other), shapes optimized for transport (for example, shaped particles, such as in the form of additives, with wings for transport in the fracture), shapes optimized for plugging (for example, shaped particles and/or shaped uniform particles in the form of Platonic and Archimedean solids), and shapes optimized for reducing dispersion in the wellbore (for example, shaped particles with hairs of a length sufficient to entangle other particles).

In some embodiments, "additive manufacturing" may be used for designing shaped particles and/or shaped uniform particles optimized for a specific well, or well condition, such as one that has been assessed, observed, and/or measured by a downhole characterization tool, such as logs. For example, in some embodiments, the treatment fluid may comprise a plurality of first particles, where each particle of the plurality of first particles has a first three-dimensional shape, and plurality of second particles, where each particle of the plurality of second particles has a second three-dimensional shape. The first three-dimensional shape may include one or more male connectors, and the second three-dimensional shape may include one or more female connectors, where each female connector is capable of engaging a male connector of the first three-dimensional shape. In some embodiments, the one or more female connectors may be concave female connectors that engage a convex male connector. In such embodiments, such shaped particles and/or shaped uniform particles (that is the shapes having one or more concave female connectors and the shapes having one or more convex male connectors) may be manufactured, for example, using a 3D printer at a location at or near the well site.

In some embodiments, a mobile unit of additive manufacturing could be made to be available onsite (at or near the location the wellbore) to modify the shape or size of the particles to be pumped based on results observed and/or measured by a downhole characterization tool, such as an outcome of a logging procedure. Such a manufacturing unit may be used to generate a plurality of first particles at the well site via an apparatus for a building a three dimensional object, the apparatus comprising: a storage chamber for storing build material (for example, one or more materials of the shaped particles of the present disclosure); and a metering system to regulate the quantity of build material delivered from the storage chamber to an operating position. Additive manufacturing enables printing the shapes locally when rapid design changes are desired. An example of such circumstances may include running a known imaging technique, such as a Fullbore Formation MicroImager (FMI) log, to characterize the size of the natural fractures to be plugged by a subsequent treatment; then, based on the interpretation, shaped particles and/or shaped uniform particles can be customized for the size of the fracture in a mobile unit of additive manufacturing available on site or in close proximity to the site. For example, customization may be accomplished by starting with a list of available computer aided design (CAD) files which contain a technical drawing with dimension specifications of the desired shape representing suitable shapes for the intended downhole operation, such as the shapes of FIGS. 1, 2A and 2B. Such embodiments are of interest for remote locations where additive manufacturing enables storing raw materials and CAD files instead of a cumbersome storage of a variety of sizes, shapes, and compositions of various shaped particles and/or shaped uniform particles.

In embodiments, the particle size, density and/or concentration of the shaped particles and/or shaped uniform particles may be selected to be any suitable value that is effective to perform the intended function of the treatment fluid, such as for zonal isolation, treatment diversion, preventing and/or inhibiting particulate material flow (such as proppant, natural formation particulates and fines).

In some embodiments, the particle size (that is, the diameter of the smallest imaginary circumscribed sphere that includes the shaped particle or shaped uniform particle) of the shaped particles and/or shaped uniform particles may be in a range of from about 100 µm to about 5 cm, or in a range of from about 100 µm to about 1 cm, or in a range of from about 400 µm to about 1000 µm. In some embodiments, the particle size of the shaped particles and/or shaped uniform particles may in a range of from about 2 mm to about 10 mm, or in a range of from about 3 mm to about 10 mm, or in a range of from about 4 mm to about 8 mm. The shaped particles and/or shaped uniform particles may have any desired an aspect ratio, such as an aspect ratio in the range of from about 1 to about 100, or in the range of from about 1 to about 10.

In some embodiments, the shaped particles and/or shaped uniform particles may have an average density in the range of from about 1 g/cm$^3$ to about 7 g/cm$^3$, or in the range of from about 1 g/cm$^3$ to about 4 g/cm$^3$, or in the range of from about 1.1 g/cm$^3$ to about 3.0 g/cm$^3$, or in the range of from about 1.1 g/cm$^3$ to about 2.7 g/cm$^3$. In some embodiments, the shaped particles or shaped uniform particles may be may be selected such that the density thereof matches that of the other particulate materials (such as proppants) employed, or the shaped particles or shaped uniform particles may be selected to have an average density that is within ±50% of the average density of the particulate materials (such as proppants) employed.

In some embodiments, the concentration of the shaped particles and/or shaped uniform particles in the treatment fluid may be any desired value, such as a concentration in the range of from about 0.01 to about 10% by weight of the treatment fluid, or a concentration in the range of from about 0.1 to about 4% by weight of the treatment fluid, or a concentration in the range of from about 1 to about 2% by weight of the treatment fluid.

In embodiments, the selection of the particle size, density and/or concentration of the shaped particle or shaped uniform particle may be dependent upon the characteristics of the formation to be treated. For example, the particle size of the largest of the shaped particles or shaped uniform particles (in the event there is a size distribution of shaped particles or shaped uniform particles contained in the treatment fluid) may be selected (and/or manufactured, for example, at the surface of the well that penetrates a subterranean formation) to be slightly smaller than the diameter of the perforation holes in a casing through which the shaped particles or shaped uniform particles will be introduced.

Figure 4:
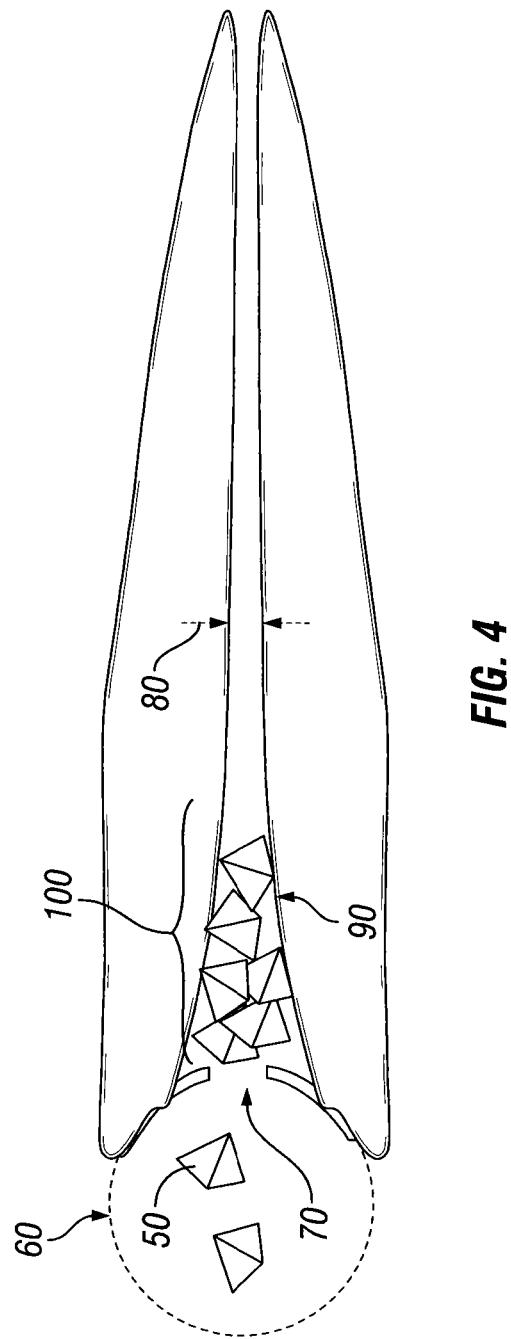
FIG. 4 is an illustration of using shaped uniform particles for creating plugs in the proximity to a wellbore.

In some embodiments, the size of the shaped particles or shaped uniform particles may be selected to enable the shaped particles or shaped uniform particles to jam in voids (such as fractures, wormholes and/or perforations) in the subterranean formation being treated in the proximity to the wellbore. In some embodiments, such as where the shaped particles or shaped uniform particles are introduced via a cased wellbore, the shaped particles or shaped uniform particles may be selected (and/or manufactured, such as at the surface of the well that penetrates a subterranean formation) to have a size that is smaller than the diameter of perforation holes in the casing, but larger than the width of the expected void in the formation (for example, larger than fracture width). FIG. 4 provides illustration of such circumstances in which plugs composed of shaped uniform particles (in FIG. 4, the shaped uniform particles depicted are of a tetrahedron shape) will be created in close proximity to the wellbore and such plugs will use very small amount of diverting material (shaped uniform particles, or shaped particles), such as a total amount of from about 50 g to about 100 kg, or from about 1 kg to about 50 kg of shaped particles (such as shaped uniform particles comprising one or more flat faces and/or one or more congruent faces) in the treatment fluid used to form the plug. In some embodiments a mixture of uniformly shaped particles and non-shaped particles can be used.

In some embodiments, the selection of the size of the shaped particles or shaped uniform particles (in the distribution of shaped particles or shaped uniform particles) may be dependent upon if there is a void behind a casing. For example, if a void is present behind the casing, the size of the shaped particles or shaped uniform particles may be selected to be larger than the average width of the voids behind casing (such as perforation tunnels, fractures or wormholes).

In some embodiments, the size of the shaped particles and/or shaped uniform particles may be selected to be larger than an average width of the void intended to be closed or temporally isolated. The average width of the void may be the smallest width of the void after the perforation hole or another entry into such a void, at about 10 cm, at about 20 cm, at about 30 cm, at about 50 cm or at about 500 cm (when going in the direction that goes into the formation from the wellbore). Such a void may be any void encountered in a downhole environment, such as, for example, a perforation tunnel, hydraulic fracture or wormhole. Introducing a treatment fluid comprising the shaped particles and/or shaped uniform particles into the perforation holes may result in the shaped uniform particles filling in the voids in the proximity of the wellbore, such as in a manner that utilizes a small amount of shaped uniform particles. In some embodiments, there may an accumulation of other particles on the formed bridge. In some embodiments, the size and shape of the shaped particles and/or shaped uniform particles may be selected to reduce permeability of the formed plugs.

In some embodiments, the shaped particles and/or shaped uniform particles may possess a three-dimensional shape selected from a cylinder and a spherocylinder, such as, for example, a cylinder or a spherocylinder where the end faces of the cylinder or the spherocylinder are congruent. In some embodiments, the treatment fluid may comprise shaped uniform particles having a three-dimensional shape selected from a cylinder and a spherocylinder with any desired length (that is, its longest dimension), such as a cylinder or spherocylinder length in the range of from about 0.01 mm to about 5 cm, or in the range of from about 0.1 mm to about 20 mm, or in the range of from about 6 mm to about 10 mm. In some embodiments, the treatment fluid may comprise shaped uniform particles having a three-dimensional shape selected from a cylinder and a spherocylinder with any desired thickness/diameter (that is, its shortest dimension), such as a cylinder or spherocylinder thickness/diameter in the range of from about 0.001 mm to about 20 mm, or in the range of from about 0.01 mm to about 10 mm, or in the range of from about 0.1 mm to about 5 mm. The shaped uniform particles having a three-dimensional shape selected from a cylinder and a spherocylinder may have an aspect ratio in the range of from about 1 to about 100, or in the range of from about 1 to about 10. As used herein, the "aspect ratio" is defined as the ratio of length (longest dimension) to thickness/diameter (shortest dimension).

The shaped particles and/or shaped uniform particles may be made of any desirable material, such as a material suitable for allowing the shaped particles and/or shaped uniform particles to be manufactured on site by additive manufacturing techniques (such as 3D printing) and optimized for their desired downhole application (that is, shapes that are fit for their intended downhole purpose). In embodiments, any desired material may be used to form the shaped particles and/or shaped uniform particles used in the methods of the present disclosure, provided that it is compatible with the desired results of the treatment operation. For example, suitable materials for manufacturing the shaped particles and/or shaped uniform particles may include inorganic materials, resins, natural or synthetic materials (including silicon dioxide, bauxites, sintered bauxites, glass, natural materials, plastic materials, ceramic materials, and any combination thereof).

In some embodiments, the shaped particles and/or shaped uniform particles may have a homogeneous composition. In some embodiments, the shaped particles and/or shaped uniform particles may have a heterogeneous composition (such as a composite in which a core (of the shaped particles or shaped uniform particles) is composed of a first material and a shell material that coats the core is composed of a second material, where the first material and the second material have the different properties and/or are of a different chemical composition).

In some embodiments, the shaped particles and/or shaped uniform particles of the present disclosure may be amorphous or may have an amorphous part or region. The term "amorphous" refers, for example, to areas or regions of a material, such as a polymeric region of the shaped particles or shaped uniform particles characterized, as having no molecular lattice structure and/or having a disordered or not well-defined spatial relationship between molecules, such as a mixture of polymer molecules that is disordered (for example, where the spatial relationship between monomer units of adjacent polymer molecules is not uniform or fixed, as opposed to a crystalline polymer region).

In some embodiments, the shaped particles and/or shaped uniform particles may be semi-crystalline or may have a semi-crystalline part or region. The term "semi-crystalline" refers, for example, to areas or regions of a material such as, for example, a polymeric region of the shaped particles and/or shaped uniform particles that is characterized as having a structure that is partially amorphous and partially crystalline, but not completely one or the other.

In some embodiments, the shaped particles and/or shaped uniform particles may be crystalline or may have a crystalline part or region. The term "crystalline" refers, for example, to areas or regions of a material such as, for example, a polymeric region of the shaped particles or shaped uniform particles that is characterized as having a structure, which may be solid, with a regular, ordered arrangement of molecules, such as a regular ordered arrangement of polymer molecules were the spaces between monomer units of adjacent polymer molecules is uniform and/or fixed.

In some embodiments, the shaped particles and/or shaped uniform particles may be made of a non-removable material, which is a material that does not at least partially degrade within a desired period of time. Non-degradable materials suitable for use as the shaped particles and/or shaped uniform particles (or a plugging agent including shaped particles and/or removable shaped uniform particles) include cement, proppant and material of proppant-like composition (for example, ceramics and bauxites). The non-degradable shaped particles and/or shaped uniform particles form a non-degradable (and/or non-dissolvable) plug, which may subsequently be at least partially or completely removed using other means, such as coil tubing or an abrasive.

In some embodiments, shaped particles and/or shaped uniform particles may be removable or comprise removable components (as used herein "removable" may refer to a particle that is degradable, chemically removable, dissolvable, or capable of being melted, in a surrounding fluid or downhole condition). Plugs of such removable shaped particles and/or removable shaped uniform particles may be used for temporally zonal isolation, for example, in treatment diversion applications.

For example, removable plugging agents comprising shaped particles and/or shaped uniform particles (hereinafter simply referred to as "plugging agents") may be any materials, such as solid materials (including, for example, degradable solids and/or dissolvable solids), that may be removed within a desired period of time. In some embodiments, the removal may be assisted or accelerated by a wash containing an appropriate reactant (for example, capable of reacting with one or more molecules of the plugging agent to cleave a bond in one or more molecules in the plugging agents), and/or solvent (for example, capable of causing a plugging agent molecule to transition from the solid phase to being dispersed and/or dissolved in a liquid phase), such as a component that changes the pH and/or salinity. In some embodiments, the removal may be assisted or accelerated by a wash containing an appropriate component that changes the pH and/or salinity. The removal may also be assisted by an increase in temperature, for example when the treatment is performed before steam flooding, and/or a change in pressure.

In some embodiments, the removable plugging agent materials may be a degradable material and/or a dissolvable material. A degradable material refers to a material that will at least partially degrade (for example, by cleavage of a chemical bond) within a desired period of time such that no additional intervention is used to remove the plug. For example, at least 30% of the removable material may degrade, such as at least 50%, or at least 75%. In some embodiments, 100% of the removable material may degrade. The degradation of the removable material may be triggered by a temperature change, and/or by chemical reaction between the removable material and another reactant. Degradation may include dissolution of the removable material.

Removable shaped particles and/or removable shaped uniform particles for use as the plugging agent may be in any suitable shape described above. Suitable removable shaped particles and/or removable shaped uniform particles may degrade under downhole conditions, which may include temperatures as high as about 180° C. (about 350° F.) or more and pressures as high as about 137.9 MPa (about 20,000 psi) or more, in a duration that is suitable for the selected operation, from a minimum duration of about 0.5, about 1, about 2 or about 3 hours up to a maximum of about 24, about 12, about 10, about 8 or about 6 hours, or a range from any minimum duration to any maximum duration.

The removable materials of the shaped particles and/or shaped uniform particles may be sensitive to the environment, so dilution and precipitation properties should be taken into account when selecting the appropriate removable material. The removable material used as a sealer may survive in the formation or wellbore for a sufficiently long duration (for example, about 3 to about 6 hours). The duration should be long enough for wireline services to perforate the next pay sand, subsequent fracturing treatment(s) to be completed, and the fracture to close on the proppant before it completely settles, providing improved fracture conductivity.

Further suitable removable materials for making the shaped particles and/or shaped uniform particles and methods of use thereof include those described in U.S. Patent Application Publication Nos. 2006/0113077, 2008/0093073, and 2012/0181034, the disclosures of which are incorporated by reference herein in their entireties. Any other materials that are removable (due in-part because the materials may, for example, degrade and/or dissolve) at the appropriate time under the encountered conditions may also be employed in the methods of the present disclosure.

Removable materials, such as, for example, degradable and/or dissolvable shaped particles or shaped uniform particles, may be used in the plugging agent at high concentrations (such as from about 0.24 g/L to about 120 g/L, or from about 4.8 g/L to about 9 g/L) in order to form temporary plugs or bridges. The removable material may also be used at concentrations of at least 4.8 g/L (40 lbs/1,000 gal), at least 6 g/L (50 lbs/1,000 gal), or at least 7.2 g/L (60 lbs/1,000 gal). The maximum concentrations of these materials that can be used may depend on the surface addition and blending equipment available. In some embodiments, removable materials, such as, for example, degradable and/or dissolvable shaped particles or shaped uniform particles, may be used in the plugging agent at low concentrations (such as from about 1 lbs/1000 gal (0.12 g/L) to about 100 lbs/1000 gal (12 g/L), or from about 40 lbs/1000 gal (4.8 g/L) to about 75 lbs/1000 gal (9 g/L)) in order to form temporary plugs or bridges.

Suitable removable shaped particles and/or removable shaped uniform particles may also be made of dissolvable materials and meltable materials (both of which may also be capable of degradation). A meltable material is a material that will transition from a solid phase to a liquid phase upon exposure to an adequate stimulus, which may be temperature. A dissolvable material (as opposed to a degradable material, which, for example, may be a material that can (under some conditions) be broken in smaller parts by a chemical process that results in the cleavage of chemical bonds, such as hydrolysis) is a material that will transition from a solid phase to a liquid phase upon exposure to an appropriate solvent or solvent system (that is, it is soluble in one or more solvent). The solvent may be the carrier fluid used for fracturing the well, or the produced fluid (hydrocarbons) or another fluid used during the treatment of the well. In some embodiments, dissolution and degradation processes may both be involved in the removal of the plugging agent.

In some embodiments, the composition of the shaped particles and/or shaped uniform particles may be selected such that the degradation/removal of the shaped particles and/or shaped uniform particles may be initiated by a triggering event, such as a predetermined condition of the well, a condition detected in the well via a characterization tool, or a condition that is brought about by introducing a composition into the well (such as by a pumping procedure), that allows the degradation/removal of the degradable shaped particles and/or degradable shaped uniform particles to proceed in a manner effective to remove the degradable shaped particles and/or degradable shaped uniform particles from the formation.

As used herein, the term "triggering event" refers to any action that changes the characteristics of one or more of the shaped particles and/or shaped uniform particles of the present disclosure in an amount sufficient to initiate the degradation/removal of the shaped particles and/or shaped uniform particles in a manner effective to remove the particle(s) from the formation. The terms "trigger", "triggering" and "triggered," as used herein, may include exposing the one or more of the shaped particles and/or shaped uniform particles to a thermal means, such as electromagnetic radiation, a high temperature treatment fluid and/or one or more temperatures within the subterranean formation temperature, such as bottom hole static temperature, to initiate, induce or cause the one or more of the shaped particles and/or shaped uniform particles to transform into a dissolvable and/or degradable material. In some embodiments, the thermal triggering event may be brought about by exposure to electromagnetic radiation, such as microwaves, infrared waves and/or other radiation types, effective to raise the temperature of the one or more shaped particles and/or shaped uniform particles such that it will transform a non-permeable coating of the one or more shaped particles and/or shaped uniform particles into a permeable coating that may be penetrated by an aqueous fluid capable of dissolving the shaped particles and/or shaped uniform particles.

Suitable degradable materials that may be used to make the shaped particles and/or shaped uniform particles of the present disclosure may include, for example, polymeric materials that are capable of generating acids upon degradation. These polymer materials may herein be referred to as "polymeric acid precursors." In some embodiments, these materials may be solids at room temperature. Such polymeric acid precursor materials may include, for example, polymers and oligomers that hydrolyze or degrade in predetermined chemical environments under known and controllable conditions of temperature, time and pH to release organic acid molecules, which may be referred to as "monomeric organic acids." As used herein, the expression "monomeric organic acid" or "monomeric acid" may also include dimeric acid or acid with a small number of linked monomer units that function similarly to monomer acids composed of one monomer unit.

Suitable polymeric materials of the shaped particles and/or shaped uniform particles of the present disclosure may also include polyesters obtained by polymerization of various hydroxycarboxylic acids, such as a polyester of lactic acid, referred to as polylactic acid; a polyester of glycolic acid, referred to as polyglycolic acid; a polyester of 3-hydroxybutyric acid, referred to as polyhydroxybutyrate; a polyester of 2-hydroxyvaleric acid, referred to as polyhydroxyvalerate; a polyester of epsilon caprolactone, referred to as polyepsilon caprolactone or polyprolactone; a polyester of hydroxylaminoacids such as serine, threonine and tyrosine; and/or copolymers obtained by mixtures of the monomers listed above. Such polyesters may have any desired molecular weight. For example, the number of monomers incorporated into suitable polymers (that is, the degree of polymerization) may be in a range of about 2 to about 50,000, such as in a range of about 20 to about 5,000.

An example of a suitable polymeric acid precursor, as mentioned above, is a polymer of lactic acid (also referred to as polylactic acid, "PLA," polylactate or polylactide). Lactic acid is a chiral molecule and has two optical isomers. These are D-lactic acid and L-lactic acid. The poly(L-lactic acid) and poly(D-lactic acid) forms are crystalline in nature. Polymerization of a mixture of the L- and D-lactic acids to poly(DL-lactic acid) results in a polymer that is more amorphous in nature. In some embodiments, the polymers used to make the shaped particles and/or shaped uniform particles of the present disclosure are linear. Any suitable degree of polymerization of the linear polylactic acid may be used, such as a degree of polymerization in a range of from about 2 to about 100, or a degree of polymerization in a range of from about 20 to about 80. In some embodiments, the degree of polymerization of the linear polylactic acid may be in a range of from about 1,000 to about 5,000, or a degree of polymerization in a range of from about 2,000 to about 4,000. Cyclic structures may also be used. In some embodiments, the degree of polymerization of these cyclic structures may be smaller than that of the linear polymers. Such cyclic structures may also include cyclic dimers.

Another suitable example of a polymer that may be used to make the shaped particles and/or shaped uniform particles of the present disclosure is a polymer of glycolic acid (hydroxyacetic acid), also known as polyglycolic acid (PGA), or polyglycolide, and/or the polymers described in U.S. Pat. Nos. 4,848,467; 4,957,165; and 4,986,355, which are herein incorporated by reference in their entireties.

The polylactic acid and polyglycolic acid may each be used as homopolymers, which may contain less than about 0.1% by weight of other comonomers. As used with reference to polylactic acid, "homopolymer(s)" is meant to include polymers of D-lactic acid, L-lactic acid and/or mixtures or copolymers of pure D-lactic acid and pure L-lactic acid. Additionally, random copolymers of lactic acid and glycolic acid and block copolymers of polylactic acid and polyglycolic acid may be used. Combinations of the described homopolymers and/or the above-described copolymers may also be used.

In some embodiments, the extent of the crystallinity may be controlled by the manufacturing method for homopolymers and by the manufacturing method and the ratio and distribution of lactide and glycolide for the copolymers. In some embodiments, the polymers may be selected such that some of the polymers (used to make the shaped uniform particles of the present disclosure) dissolve very slowly, such as within a few days, months or years, in water before they hydrolyze.

In some embodiments, amorphous polymers may be used to form the shaped particles and/or shaped uniform particles of the present disclosure. An example of a commercially available amorphous polymer is that available as NATUREWORKS 4060D PLA, available from NatureWorks, LLC, which is a poly(DL-lactic acid) and contains approximately 12% by weight of D-lactic acid and has a number average molecular weight (Mn) of approximately 98,000 g/mol and a weight average molecular weight (Mw) of approximately 186,000 g/mol.

Additional polymer materials that may be used as components of the shaped particles and/or shaped uniform particles of the present disclosure are polyesters obtained by polymerization of polycarboxylic acid derivatives, such as dicarboxylic acids derivatives with polyhydroxy containing compounds, like dihydroxy containing compounds. Polycarboxylic acid derivatives that may be used include dicarboxylic acids, such as oxalic acid, propanedioic acid, malonic acid, fumaric acid, maleic acid, succinic acid, glutaric acid, pentanedioic acid, adipic acid, phthalic acid, isophthalic acid, terphthalic acid, aspartic acid, or glutamic acid; polycarboxylic acid derivatives, such as citric acid, poly and oligo acrylic acid and methacrylic acid copolymers; dicarboxylic acid anhydrides, such as, maleic anhydride, succinic anhydride, pentanedioic acid anhydride, adipic anhydride, phthalic anhydride; dicarboxylic acid halides, primarily dicarboxylic acid chlorides, such as propanedioic acil chloride, malonyl chloride, fumaroil chloride, maleyl chloride, succinyl chloride, glutaroyl chloride, adipoil chloride, phthaloil chloride. Suitable polyhydroxy containing compounds include dihydroxy compounds, such as ethylene glycol, propylene glycol, 1,4 butanediol, 1,5 pentanediol, 1,6 hexanediol, hydroquinone, resorcinol, bisphenols, such as bisphenol acetone (bisphenol A) or bisphenol formaldehyde (bisphenol F); polyols such as glycerol. The components obtained from the above formulations may be hydrolyzed or "degraded" to carboxylic acid monomers, and thus may be considered as polymeric acid precursors.

In the appropriate conditions (pH, temperature, water content) polyesters like those described herein can "hydrolyze" and "degrade" to yield polycarboxylic acids and polyhydroxy compounds, irrespective of the original polyester being synthesized from either one of the polycarboxylic acid derivatives listed above. The polycarboxylic acid compounds the polymer degradation process will yield are also considered monomeric acids.

In some embodiments, a solid polymeric acid precursor material that is used to form the shaped particles and/or shaped uniform particles of the present disclosure may be capable of undergoing an irreversible breakdown into fundamental acid products. The term "irreversible" means that the solid polymeric acid precursor material, once broken downhole, should not reconstitute while downhole, for example, the material should break down in situ but should not reconstitute in situ. The term "break down" refers to both the two relatively extreme cases of hydrolytic degradation that the solid polymeric acid precursor material may undergo, for example, bulk erosion and surface erosion, and any stage of degradation in between these two. This degradation may be a result of, inter alia, a chemical reaction. The rate at which the chemical reaction takes place may depend on, inter alia, the chemicals added, temperature and time. The degradation or break down of solid polymeric acid precursor materials may depend, at least in part, on its structure. For example, the presence of hydrolyzable and/or oxidizable linkages in the backbone may yield a shaped particle and/or shaped uniform particle that will break down as described herein. The rates at which such polymers break down are dependent on factors such as the type of repetitive unit, composition, sequence, length, molecular geometry, molecular weight, morphology (for example, crystallinity, size of spherulites, and orientation), hydrophilicity, hydrophobicity, surface area, and additives. The manner in which the polymer breaks down also may be affected by the environment to which the polymer is exposed, for example, temperature, presence of moisture, oxygen, microorganisms, enzymes, pH, and the like.

In some embodiments, the materials of the shaped particles and/or shaped uniform particles may be selected such that the shaped particles and/or shaped uniform particles will react with chemical agents. Some examples of such materials that may be removed by reacting with other agents are carbonates including calcium and magnesium carbonates and mixtures thereof (reactive to acids and chelates); acid soluble cement (reactive to acids); polyesters including esters of lactic hydroxylcarbonic acids and copolymers thereof (which can be hydrolyzed with acids and bases); active metals such as magnesium, aluminum, zinc and their alloys (reactive to water, acids and bases). In some embodiments, the shaped particles and/or shaped uniform particles may also contain a material that accelerates degradation of other components of the formed plug, such as metal oxides (for example, MgO) or bases (for example, Mg(OH)$_2$; Ca(OH)$_2$) or salts of weak acids (for example, CaCO$_3$) for accelerating hydrolysis of polyesters such as polylactic or polyglycolic acids.

In some embodiments, the materials of the shaped particles and/or shaped uniform particles may be selected such that the shaped particles and/or shaped uniform particles will melt. Examples of materials capable of melting under downhole conditions that can be used to form the shaped particles and/or the shaped uniform particles include hydrocarbons with number of carbon atoms less than 30; polycaprolactones; paraffin and waxes; carboxylic acids, such as benzoic acid and its derivatives. In such embodiments, the shaped particles and/or shaped uniform particles will be solid at the temperature of the injected fluid, and such a fluid may cool the formation such that the particles enter the formation and remain solid.

In some embodiments, the materials of the shaped particles and/or shaped uniform particles may be selected such that the shaped particles and/or shaped uniform particles are composed of a water-soluble material or hydrocarbon-soluble material. Suitable water-soluble materials include, for example, water-soluble polymers, water-soluble elastomers, carbonic acids, rock salt, amines, and inorganic salts). Suitable hydrocarbon-soluble materials include, for example, oil-soluble polymers, oil-soluble resins, oil-soluble elastomers, polyethylene, carbonic acids, amines, waxes).

The shaped particles and/or shaped uniform particles may be resin coated, provided that the resin and any other chemicals in the coating are compatible with the other chemicals of the present disclosure. In embodiments, the outermost surface of the shaped particles and/or shaped uniform particles may be an amorphous polymer capable of degrading and/or decomposing, such as amorphous polylactic acid, upon exposure to a predetermined temperature at or above a predetermined degradation/decomposition initiation temperature of the polymer. Other suitable amorphous polymers capable of degrading upon exposure to a predetermined temperature that can be used in the methods of the present disclosure include, for example, polystyrene, poly (methyl methacrylate) and polyethylene terephthalate. Such polymers may serve as a coating and/or the sheath of the shaped particles and/or shaped uniform particles of the present disclosure. In such embodiments, the core of the shaped particles and/or shaped uniform particles of the present disclosure may be a crystalline or semi-crystalline polymer, such as semi-crystalline polylactic acid. Other suitable crystalline or semi-crystalline polymers that are capable of decomposing and/or degrading upon exposure to a predetermined temperature that can be used in the methods of the present disclosure include, for example, polyethylene, polypropylene and polyethylene terephthalate.

In some embodiments, the particle size, density and/or concentration of the shaped particles or shaped uniform particles (in the distribution of shaped particles or shaped uniform particles) may be dependent upon the desired fluid loss characteristics of the shaped particles or shaped uniform particles as a fluid loss agent, the size of pores in the formation, and/or the sizes of other particulates comprised in the treatment fluid. For example, in some embodiments, a diverting blend comprising shaped particles and/or shaped uniform particles may be designed and used for sealing perforation tunnels (for example, slick-water treatments) the amount of diverting material (that is, the amount of shaped particles and/or shaped uniform particles, such as shaped uniform particles comprising one or more flat faces and/or one or more congruent faces, in such a treatment fluid) used for treatment diversion between several perforation clusters may be as low as a tens of grams to several kilograms (kg), such as from about 0.5 kg to about 100 kg, or from about 20 to about 60 kg of shaped particles and/or shaped uniform particles. In some embodiments, removal of the particles may be achieved either by self-degradation at downhole conditions, or by introducing chemical agents, or by wellbore intervention.

In some embodiments, the treatment fluid including a composition comprising shaped particles and/or shaped uniform particles enables zonal isolation by creating plugs in the proximity (such as less than 50 feet, or less than 30 feet, or less than 10 feet, or less than 5 feet from the center of the wellbore) of the wellbore. In comparison to traditional treatment diversion techniques, the treatment fluids including a composition comprising shaped uniform particles uses a lower amount of diverting material and is not sensitive to particle separation during pumping. In addition, there is a lower risk of wellbore plugging, a lower risk of formation damage, and better clean up.

The methods of the present disclosure that comprise fracturing a subterranean formation may include a composition containing the shaped particles and/or shaped uniform particles of the present disclosure in one or more of the treatment fluids, but otherwise use conventional fracturing techniques known in the art.

In some embodiments, the treatment fluids used in the methods of the present disclosure may include a composition comprising a first plurality of shaped uniform particles where the shape of each particle in the in the plurality of shaped particles is substantially identical, and a second plurality of shaped particles, such as, for example, a second plurality of shaped particles comprising non-uniform or non-congruently shaped particles or fibrous material, where the shape of each particle or fiber in the second plurality of shaped particles is not substantially identical (that is, falling outside of the above definition of substantially identical).

In some embodiments, the treatment fluids used in the methods of the present disclosure may include a composition comprising shaped particles including a first plurality of shaped particles, such as a first plurality of shaped uniform particles comprising one or more flat faces and/or one or more congruent faces, and a second plurality of shaped particles, such as a second plurality of shaped uniform particles comprising one or more flat faces and/or one or more congruent faces. In some embodiments, the second plurality of shaped uniform particles may have a different shape and/or composition relative to the first plurality of shaped uniform particles.

In some embodiments, the shaped uniform particles may be particles having a uniform rigid core and elements made of film or flakes which serve to reduce permeability of packs of such particles. For example, permeability of packs of such particles may be reduced where the flakes or film become arranged in a manner that restricts the void space between the particles, thereby reducing the ability of a fluid to flow between the particles and therefore leading to reduced permeability of the pack. Some examples of such particles are hairy particles and spheres comprising attached film components. In some embodiments, such hairy particles may be shaped particles having a round particle (for example, having a size (diameter) of about 2 mm to about 8 mm, such as about 3 mmm to about 7 mm) made of PLA with fibers attached thereto, for example, fibers having a diameter of about 6 microns to about 20 microns, or about 8 microns to about 16 microns, which are about 1 mm to about 10 mm (such as about 2 mm to about 8 mm) in length. In some embodiments, spheres comprising attached film component(s) may be shaped particles having a round particle (for example, having a size (diameter) of about 2 mm to about 8 mm, such as about 3 mmm to about 7 mm) made of PLA, with a film having a thickness of about 10 microns to about 100 microns, or about 20 microns to about 80 microns, protruding from the particle at a distance of from about 1 mm to 10 mm, or from about 2 mm to 8 mm.

In some embodiments, creating plugs of diverting blends comprising the shaped particles and/or shaped uniform particles of the present disclosure may occur by accumulating particles in the void space behind a casing, such as perforation tunnels, hydraulic fractures and/or wormholes. After treatment, the created plugs may be removed by any known method. For example, if the composition comprises degradable materials, degradable shaped particles and/or degradable shaped uniform particles, self-degradation may occur; or if the composition comprises shaped particles and/or shaped uniform particles that react with chemical agents, the shaped particles and/or shaped uniform particles may be removed by reacting with chemical agents; or if the shaped particles and/or shaped uniform particles comprise a melting material, melting may result in reduction in mechanical stability of the plug; or if the shaped particles and/or shaped uniform particles comprise water soluble or hydrocarbon soluble materials, plug removal may be achieved through physical dissolution or disintegration of at least one of the components of the diverting blend in the surrounding fluid.

As indicated above, the treatment fluid carrying shaped particles and/or shaped uniform particles may be any well treatment fluid, such as a fluid loss control pill, a water control treatment fluid, a scale inhibition treatment fluid, a fracturing fluid, a gravel packing fluid, a drilling fluid, and a drill-in fluid. The carrier solvent for the treatment fluid may be a pure solvent or a mixture. Suitable solvents for use with the methods of the present disclosure, such as for forming the treatment fluids disclosed herein, may be aqueous or organic based.

For example, the treatment fluid to be used in the methods of the present disclosure may include a fluid (such as a carrier solvent) and a composition comprising shaped particles and/or shaped uniform particles. The fluid may be any suitable fluid, such as, for example, water, fresh water, produced water, seawater, or an aqueous solvent, such as brine, mixtures of water and water-soluble organic compounds and mixtures thereof. Other suitable examples of fluids include hydratable gels, such as guars, poly-saccharides, xanthan, hydroxy-ethyl-cellulose; cross-linked hydratable gels, viscosified acid, an emulsified acid (such as with an oil outer phase), an energized fluid (including, for example, an $N_2$ or $CO_2$ based foam), and an oil-based fluid including a gelled, foamed, or otherwise viscosified oil.

Suitable organic solvents that may act as a carrier solvent for the treatment fluids of the disclosure include, for example, alcohols, glycols, esters, ketones, nitrites, amides, amines, cyclic ethers, glycol ethers, acetone, acetonitrile, 1-butanol, 2-butanol, 2-butanone, t-butyl alcohol, cyclohexane, diethyl ether, diethylene glycol, diethylene glycol dimethyl ether, 1,2-dimethoxy-ethane (DME), dimethylether, dibutylether, dimethyl sulfoxide (DMSO), dioxane, ethanol, ethyl acetate, ethylene glycol, glycerin, heptanes, hexamethylphosphorous triamide (HMPT), hexane, methanol, methyl t-butyl ether (MTBE), N-methyl-2-pyrrolidinone (NMP), nitromethane, pentane, petroleum ether (ligroine), 1-propanol, 2-propanol, pyridine, tetrahydrofuran (THF), toluene, triethyl amine, o-xylene, m-xylene, p-xylene, ethylene glycol monobutyl ether, polyglycol ethers, pyrrolidones, N-(alkyl or cycloalkyl)-2-pyrrolidones, N-alkyl piperidones, N, N-dialkyl alkanolamides, N,N,N', N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene carbonates, alkyl carbonates, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene carbonate, diethyl carbonate, ethylmethyl carbonate, dibutyl carbonate, lactones, nitromethane, nitrobenzene sulfones, tetrahydrofuran, dioxane, dioxolane, methyltetrahydrofuran, dimethylsulfone, tetramethylene sulfone, diesel oil, kerosene, paraffinic oil, crude oil, liquefied petroleum gas (LPG), mineral oil, biodiesel, vegetable oil, animal oil, aromatic petroleum cuts, terpenes, mixtures thereof.

While the treatment fluids of the present disclosure are described herein as comprising the above-mentioned components, it should be understood that the treatment fluids of the present disclosure may optionally comprise other chemically different materials. In embodiments, the treatment fluid may further comprise stabilizing agents, surfactants, diverting agents, or other additives. Additionally, a treatment fluid may comprise a mixture of various crosslinking agents, and/or other additives, such as fibers or fillers, provided that the other components chosen for the mixture are compatible with the intended use of the treatment fluid. Furthermore, the treatment fluid may comprise buffers, pH control agents, and various other additives added to promote the stability or the functionality of the treatment fluid. The components of the treatment fluid may be selected such that they may or may not react with the subterranean formation that is to be treated.

In this regard, the treatment fluid may include components independently selected from any solids, liquids, gases, and combinations thereof, such as slurries, gas-saturated or non-gas-saturated liquids, mixtures of two or more miscible or immiscible liquids. For example, the treatment fluid may comprise organic chemicals, inorganic chemicals, and any combinations thereof. Organic chemicals may be monomeric, oligomeric, polymeric, crosslinked, and combinations thereof, while polymers may be thermoplastic, thermosetting, moisture setting, or elastomeric. Inorganic chemicals may be metals, alkaline and alkaline earth chemicals, or minerals.

For example, in some embodiments, the carrier solvent of the treatment fluid may also include any other desirable chemical, such as, for example, hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloroacetic acid, an amino-poly-carboxylic acid, 3-hydroxypropionic acid, a poly-amino-poly-carboxylic acid, and/or a salt of any acid. In some embodiments, the carrier fluid may include a poly-amino-poly-carboxylic acid, trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate.

In some embodiments, any desired particulate material may be used in the methods of the present disclosure, provided that it is compatible with the shaped particles and/or shaped uniform particles, the formation, the fluid, and the desired results of the treatment operation. For example, particulate materials may include sized sand, synthetic inorganic proppants, coated proppants, uncoated proppants, resin coated proppants, and resin coated sand. The proppants may be natural or synthetic (including silicon dioxide, sand, nut hulls, walnut shells, bauxites, sintered bauxites, glass, natural materials, plastic beads, particulate metals, drill cuttings, ceramic materials, and any combination thereof), coated, or contain chemicals; more than one may be used sequentially or in mixtures of different sizes or different materials. The proppant may be resin coated, provided that the resin and any other chemicals in the coating are compatible with the other chemicals of the present disclosure, such as the shaped particles and/or shaped uniform particles.

In embodiments where the particulate material is a proppant, the proppant used in the methods of the present disclosure may be any appropriate size to prop open the fracture and allow fluid to flow through the proppant pack, that is, in between and around the proppant making up the pack. In some embodiments, the proppant may be selected based on desired characteristics, such as size range, crush strength, and insolubility. In embodiments, the proppant may have a sufficient compressive or crush resistance to prop the fracture open without being deformed or crushed by the closure stress of the fracture in the subterranean formation. In embodiments, the proppant may not dissolve in treatment fluids commonly encountered in a well.

In some embodiments, the proppant used may have an average particle size of from about 0.15 mm to about 3.35 mm (about 100 to about 6 U.S. mesh), or of from about 0.25 to about 0.43 mm (40/60 mesh), or of from about 0.43 to about 0.84 mm (20/40 mesh), or of from about 0.84 to about 1.19 mm (16/20), or of from about 0.84 to about 1.68 mm (12/20 mesh) and or of from about 0.84 to about 2.39 mm (8/20 mesh) sized materials. The proppant may be present in a slurry (which may be added to the treatment fluid) in a concentration of from about 0.12 to about 3 kg/L, or about 0.12 to about 1.44 kg/L (about 1 PPA to about 25 PPA, or from about 1 to about 12 PPA; PPA is "pounds proppant added" per gallon of liquid). In addition to using the shaped particles and/or shaped uniform particles for diversion or for temporally zonal isolation, the methods of the present disclosure may employ the shaped uniform particles as the proppant material and/or an additional proppant material.

In some embodiments, the shaped particles and/or shaped uniform particles may be pumped with a particulate material, such as proppant, such that shaped particles and/or shaped uniform particles are uniformly mixed with the particulate material. The shaped uniform particles in the treatment fluid may not be sensitive to particle separation during pumping, while the other particulate materials in the treatment fluid may separate during pumping, such as a consequence of, for example, differing sizes, densities, and/or hydrodynamic volumes of such other particulate material. In some embodiments, a dispersion of the shaped particles and/or shaped uniform particles and the proppant may be introduced, such as by pumping, into the subterranean formation. The terms "dispersion" and "dispersed" refer, for example, to a substantially uniform distribution of components (such as shaped particles and/or shaped uniform particles and particulate material) in a mixture. In some embodiments, a dispersed phase of one or more fibers, shaped particles and/or shaped uniform particles, and particulate material may be formed at the surface.

In some embodiments, the shaped particles and/or shaped uniform particles may be mixed and dispersed throughout the entire batch of proppant to be pumped into the wellbore during the treatment operation. This may occur by adding the shaped particles and/or shaped uniform particles to the proppant before it is mixed with the treatment fluid, adding the shaped particles and/or shaped uniform particles to the treatment fluid before it is mixed with the proppant, or by adding a slurry of shaped particles and/or shaped uniform particles at some other stage, such either before the slurry is pumped downhole, or at a location downhole.

In some embodiments, the treatment fluid may be a slurry of shaped particles and/or shaped uniform particles and may be pumped into the wellbore during a portion of the treatment operation. In some embodiments, slugs of a slurry of shaped particles and/or shaped uniform particles may be pumped in between slugs of slurry of proppant. Such a series of stages may be used to control flow dynamics down the fracture, for example, by providing more plug flow-like behavior.

The shaped uniform particles in the treatment fluid (slurry) may not be sensitive to particle separation during pumping, while any other particulate materials (non-uniformly shaped particles) in the treatment fluid (slurry) or otherwise pumped downhole may separate during pumping, such as a consequence of, for example, differing sizes, densities, and/or hydrodynamic volumes of such other particulate material. Pumping of small slugs of the slurry of shaped uniform particles, such as at the tail-in, will allow for more plug flow-like behavior because such particles not differ in sizes and/or hydrodynamic volumes and thus the shaped uniform particles will experience substantially the same fluid forces during pumping.

In some embodiments, a fibrous material may also be included in the treatment fluid. For example, the treatment fluid may comprise shaped particles and/or shaped uniform particles and a fiber of any desired thickness (diameter), density and concentration that is effective to assist in the downhole operation being performed. The fiber may be one or more member selected from natural fibers, synthetic organic fibers, glass fibers, ceramic fibers, carbon fibers, inorganic fibers, metal fibers, a coated form of any of the above fibers.

Fibers or elongated particles may be used in bundles. The fibers or elongated particles may have a length in the range of from about 1 mm to about 30 mm, such as in the range of from about 5 mm to about 20 mm. For elongated materials, the materials may have an aspect ratio in the range of from about 2 to about 50, or in the range of from about 4 to about 10. The fibers or elongated materials may have any suitable diameter or cross dimension (shortest dimension), such as a diameter of from about 5 to 500 microns, or a diameter of from about 20 to 100 microns, and/or a denier of from about 0.1 to about 20, or a denier of from about 0.15 to about 6.

The fibers may be formed from a degradable material or a non-degradable material. The fibers may be organic or inorganic. Non-degradable materials are those wherein the fiber remains substantially in its solid form within the well fluids. Examples of such materials include glass, ceramics, basalt, carbon and carbon-based compound, metals and metal alloys. Polymers and plastics that are non-degradable may also be used as non-degradable fibers. Such polymers and plastics that are non-degradable may include high density plastic materials that are acid and oil-resistant and exhibit a crystallinity of greater than 10%. Degradable fibers may include those materials that can be softened, dissolved, reacted or otherwise made to degrade within the well fluids. Such materials may be soluble in aqueous fluids or in hydrocarbon fluids.

Suitable fibers may also include any fibrous material, such as, for example, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof.

In some embodiments, a slurry of a mixture of shaped particles and/or shaped uniform particles and optionally fibers, may be used for any desired reason in the entire range of reservoir applications, such as from fracturing to sand control, frac-and-sand-pack and/or high permeability stimulation. For example, the methods of the present disclosure may be used in fluid loss applications. In some embodiments, in areas of high fluid loss, the shaped particles and/or shaped uniform particles of the present disclosure, and optionally an additional fibrous and/or particulate material may concentrate into a mat, thereby minimizing additional fluid loss in these areas.

In some embodiments, shaped particles and/or shaped uniform particles may be used to design complex flow channels in the proppant pack. For example, a fracturing operation may be engineered such that voids or channels (sometimes called "fingers") of proppant flow out of the proppant pack after the pack is formed downhole, resulting in the creation of open channels which allow well fluids to flow into the wellbore without substantial restriction. In such embodiments, the proppant pack may provide an effective barrier to particles, proppant or fines that otherwise would otherwise flood into the wellbore.

Such fingers may range in length from about one inch to several feet, or in some embodiments, be even longer. The fingers may be created in any desired manner. For example, the well can be flowed back at a rate sufficient to create channels without loss of the majority of the proppant pack. A shaped particle and/or shaped uniform particle proppant pack, such as one which also utilizes fibers, may be treated with mud acid (an aqueous solution of hydrochloric acid and hydrofluoric acid) under matrix conditions to dissolve the fibers within the porous pack in finger-like patterns. This may be accomplished at treating pressures less than that commonly used to fracture the formation. When the well is allowed to flow, the proppant will be produced back from those finger-like areas which no longer contain any fibers.

In some embodiments, the treatment fluid may further have a viscosifying agent. The viscosifying agent may be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers that may be used as a viscosifying agent include polyvinyl polymers, polymethacrylamides, cellulose ethers, lignosulfonates, and ammonium, alkali metal, and alkaline earth salts thereof. Additional examples of other water soluble polymers that may be used as a viscosifying agent include acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

In some embodiments, the carrier fluid may optionally further comprise additional additives, including, for example, acids, fluid loss control additives, gas, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide.

The treatment fluid comprising a composition including shaped particles and/or shaped uniform particles may be used for carrying out a variety of subterranean treatments, including, drilling operations, fracturing treatments, diverting treatments, zonal isolation and completion operations (e.g., gravel packing). In some embodiments, the treatment fluid comprising a composition including shaped particles and/or shaped uniform particles may be used in treating a portion of a subterranean formation. In certain embodiments, the treatment fluid comprising a composition including shaped particles and/or shaped uniform particles may be introduced into a wellbore that penetrates the subterranean formation as a treatment fluid. For example, the treatment fluid may be allowed to contact the subterranean formation for a period of time. In some embodiments, the treatment fluid may be allowed to contact hydrocarbons, formations fluids, and/or subsequently injected treatment fluids. After a chosen time, the treatment fluid may be recovered through the wellbore.

Methods of well site and downhole delivery of the treatment fluid comprising a composition including shaped particles and/or shaped uniform particles are the same as for existing particulate diverting materials. For example, compositions including shaped particles and/or shaped uniform particles may be introduced in the pumping fluid and then displaced into the perforations at high pumping rate. Suitable injecting equipment may include, for example, simple flow-through injecting apparatuses, various dry additive systems and flow-through blenders. In some embodiments, the treatment fluid comprising a composition including shaped particles and/or shaped uniform particles may be delivered downhole, for example, in a bailer or in a tool comprising bailer and a perforation gun; or with a wireline tool, a drill string, through a slickline, with a coil tubing or microcoil, with a downhole tool or any type of other device introduced downhole and able to deliver the composition at a defined location.

Methods of the present disclosure in which a treatment fluid comprising a composition including shaped uniform particles avoids the risk that the shaped uniform particles will be separated during pumping through the wellbore. Thus, short slugs with high concentrations of diverting blends (including shaped uniform particles) may be introduced in the treating fluid without risk of particles prematurely separating in the plug of the pumped blend.

In embodiments, the treatment fluid may be driven into a wellbore by a pumping system that pumps one or more treatment fluids into the wellbore. The pumping systems may include mixing or combining devices, wherein various components, such as fluids, solids, and/or gases maybe mixed or combined prior to being pumped into the wellbore. The mixing or combining device may be controlled in a number of ways, including, for example, using data obtained either downhole from the wellbore, surface data, or some combination thereof.

In some embodiments, fracturing a subterranean formation may include introducing hundreds of thousands of gallons of treatment fluid, such as a fracturing fluid (optionally including shaped particles and/or shaped uniform particles), into the wellbore. In some embodiments a frac pump may be used for hydraulic fracturing. A frac pump is a high-pressure, high-volume pump, such as a positive-displacement reciprocating pump. In embodiments, a treatment fluid comprising the shaped particles of the present disclosure, such as a shaped uniform particle, may be introduced by using a frac pump, such that the treatment fluid (such as a fracturing fluid) may be pumped down into the wellbore at high rates and pressures, for example, at a flow rate in excess of about 20 barrels per minute (about 4,200 U.S. gallons per minute) at a pressure in excess of about 2,500 pounds per square inch ("psi"). In some embodiments, the pump rate and pressure of the treatment fluid (such as a fracturing fluid) may be even higher, for example, at flow rates in excess of about 100 barrels per minute and pressures in excess of about 10,000 psi may be used.

The foregoing is further illustrated by reference to the following examples, which are presented for purposes of illustration and are not intended to limit the scope of the present disclosure.

EXAMPLES

Example 1: Measurement of Permeability of Packs of Shaped Particles

Polyhedral plastic particles with maximum distance between vertexes of 6.5 mm (where 6.5 mm is the largest dimension of the particle as measured with a caliper; which is equal to the smallest value of a diameter of a circle that can be drawn around the shape without touching the shape at any point) were used, which enables particles to jam in a fracture with width of less than 6.5 mm. As a reference, spherical particles with a diameter of 6.5 mm or 4.5 mm were used. Table 1 below provides description of the particles used.

TABLE 1

Experimental particle characteristics

| Particles | Size, Edge length | Particle volume | Measured permeability |
|---|---|---|---|
| Tetrahedrons (P1) | 6.5 mm | 32 mm³ | 37 Darcy |
| Dodecahedrons (P3) | 2.3 mm | 96 mm³ | 99 Darcy |
| Octahedrons (P4) | 4.6 mm | 46 mm³ | 43 Darcy |
| Truncated tetrahedrons (A1) | 2.9 mm | 67 mm³ | 82 Darcy |
| Spheres (6.5 mm) | D = 6.5 mm | 144 mm³ | 133 Darcy |
| Spheres (4.5 mm) | D = 4.5 mm | 48 mm³ | 99 Darcy |

Figure 5:
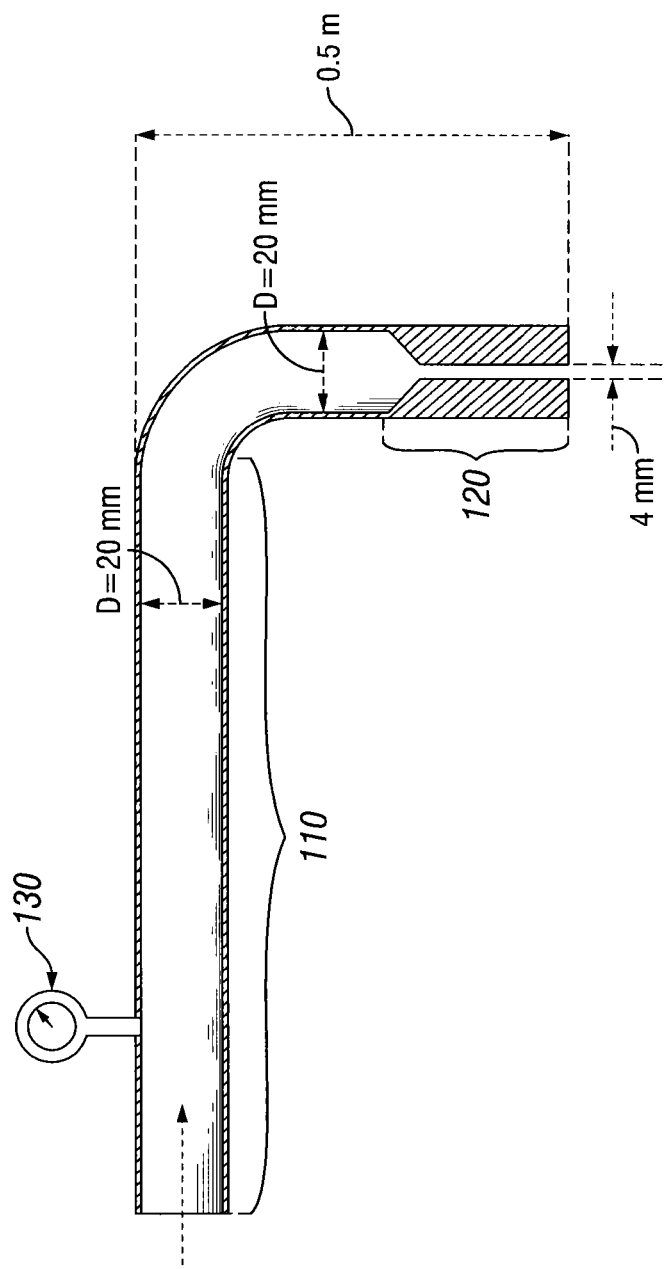
FIG. 5 is an illustration of an experimental laboratory setup used for creating a plug of shaped uniform particles.

FIG. 5 shows the device used for measuring permeability of packs of the shaped particles. For each test, 10-20 ml of the particles were placed into a horizontal pipe and then they were flushed into the 4 mm slot with water at an initial pumping rate of 36 L/min. Then a pressure drop across the formed plug (50-80 psi) and steady pumping rate (8-25 L/min) were measured. The experiment was then stopped and the length of the formed plug was estimated. The permeability was calculated using the Darcy equation, where a lower measured value reflects that there is a lower permeability. As seen in Table 1, the shape of the particles has an impact on permeability of the formed plug.

Example 2: Forming a Plug with Shaped Particles

Figure 6:
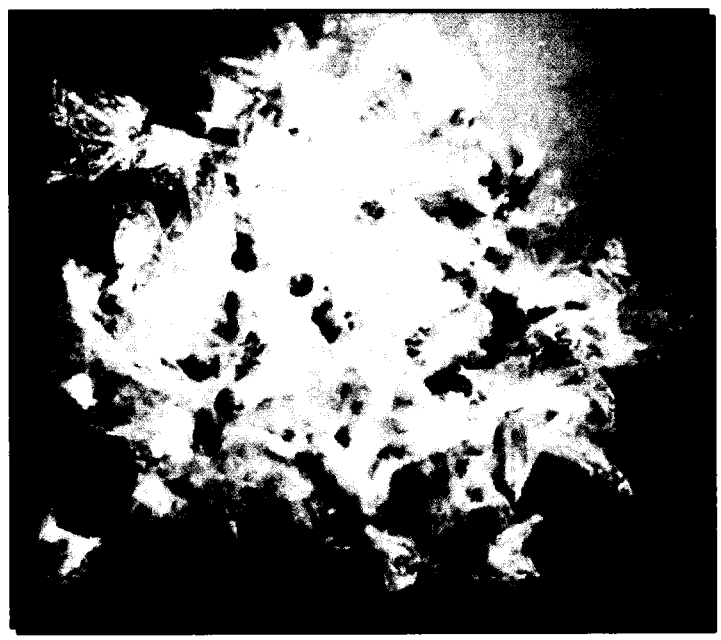
FIG. 6 is a photograph of shaped particles including rigid core and film components.

Particles comprising a rigid core and film component shown in FIG. 6 were made. The prototypes were made by gluing pieces of polyester film with thickness of 50 microns to plastic balls having particle size (diameter) of 6 mm.

Figure 7:
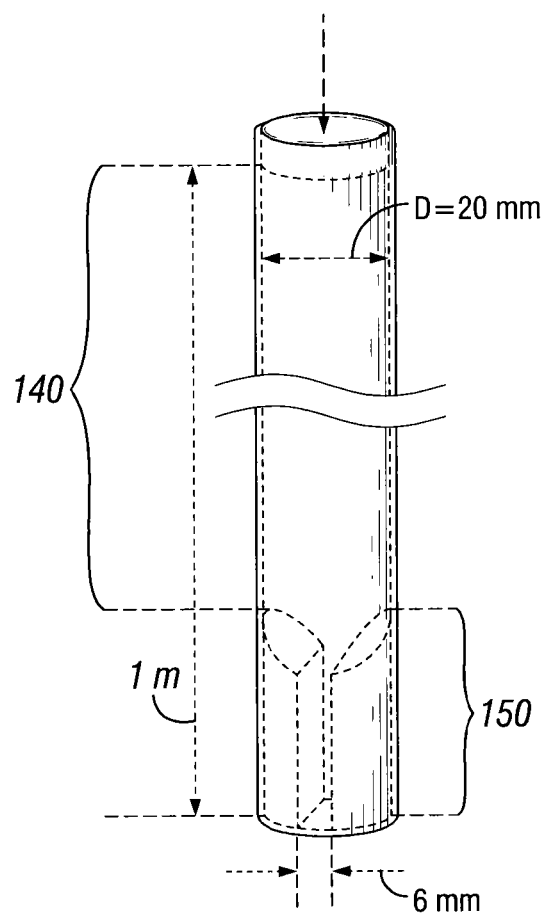
FIG. 7 is an illustration of an experimental laboratory setup used for creating a plug of shaped uniform particles.

FIG. 7 shows the device used for creating the plug. The setup includes a piece of tube, which serves as an accumulator for a plug and is connected to a 6 mm slot from one end and to a pump from the other end. Before the experiment, the accumulator was filled with the shaped particles, which were suspended in 0.5% guar gum solution. Then the content of the accumulator was displaced into the slot with water at pumping rate of 1 L/min. The permeability of the formed plug was calculated based on the pressure drop across the plug of approximately 20 psi and a plug length of 9 cm using Darcy's law. The obtained permeability value was 30 Darcy.

Although the preceding description has been described herein with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure of METHODS OF ZONAL ISOLATION AND TREATMENT DIVERSION WITH SHAPED PARTICLES. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for treating a subterranean formation, comprising:
   using a downhole characterization tool to perform a downhole logging or imaging operation to measure the sizes of fractures, wormholes and perforations in the subterranean formation;
   using the results of the logging or imaging operation to determine an optimal size of particles for plugging the fractures, wormholes and perforations
   choosing a three-dimensional particle shape of the particles to reduce permeability of a plug of the particles, wherein the particles comprise a rigid core with a component attached to the rigid core, the components selected from the group consisting of a fiber, a film, and a flake, wherein the rigid core is a sphere, and the plug permeability is at least 56% lower than a second plug consisting of spheres having a size substantially equal to that of the particles; and
   introducing into a subterranean formation, a treatment fluid comprising the particles forming a plug in the subterranean formation.

2. The method of claim 1, wherein the plug is formed in one or more of a perforation, a fracture, or a wellbore in the subterranean formation.

3. The method of claim 1, wherein the plurality of particles are composed of one or more material selected from the group consisting of degradable materials, chemically removable materials, dissolvable materials, meltable materials and non-removable materials.

4. A method of treating a subterranean formation, comprising:
using a downhole characterization tool to perform a downhole logging or imaging operation to measure the sizes of fractures, wormholes and perforations in the subterranean formation;
using the results of the logging or imaging operation to determine an optimal size of first particles for plugging the fractures, wormholes and perforations;
choosing a first three-dimensional particle shape of the first particles to reduce a permeability of a plug of the first particles, the first particles having a rigid core with a component attached to the rigid core, the component selected from the group consisting of a fiber, a film and a flake, wherein the rigid core is a sphere, and the plug permeability is at least 56% lower than a second plug consisting of spheres having a size substantially equal to that of the particles;
manufacturing a plurality of the first particles at the well site via an apparatus for building a three dimensional object, the apparatus comprising: a storage chamber for storing build material; a metering system to regulate the quantity of build material delivered from the storage chamber to an operating position; and a 3D printer;
introducing into a subterranean formation, a treatment fluid comprising the first particles, the first particles forming a plug in the subterranean formation.

5. The method of claim 4, wherein at least a portion of the first particles are made from a degradable material.

6. The method of claim 4, wherein the treatment fluid further comprises one or more additives selected from the group consisting of proppants, fibers, flakes and particulate materials.

7. The method of claim 4, further comprising degrading the first particles to remove the plug and increase the permeability of the subterranean formation, wherein the degradation of the first particles is triggered by a solvent, a temperature change, by a chemical reaction between the first particles and another reactant, or by a combination thereof.

8. The method of claim 4, wherein the treatment fluid further comprises second particles, where each of the second particles has a second three-dimensional shape.

9. The method of claim 8, wherein the treatment fluid further comprises third particles, where each of the third particles has a third three-dimensional shape, wherein the third three-dimensional shape includes one or more male connectors, and the second three-dimensional shape includes one or more female connectors, where each female connector is capable of engaging a male connector of the third three-dimensional shape.

\* \* \* \* \*